US012366094B2

(12) United States Patent
Kleister et al.

(10) Patent No.: US 12,366,094 B2
(45) Date of Patent: Jul. 22, 2025

(54) ELECTRONIC STRIKER FOR RELEASING A COMPARTMENT DOOR AND METHOD OF USING THE SAME

(71) Applicant: Southco, Inc., Concordville, PA (US)

(72) Inventors: Paul Kleister, Gloucester (GB); Henry Daniel Birch, Worcester (GB)

(73) Assignee: Southco, Inc., Concordville, PA (US)

( * ) Notice: Subject to any disclaimer, the term of this patent is extended or adjusted under 35 U.S.C. 154(b) by 468 days.

(21) Appl. No.: 17/620,920

(22) PCT Filed: Jun. 18, 2020

(86) PCT No.: PCT/US2020/038450
§ 371 (c)(1),
(2) Date: Dec. 20, 2021

(87) PCT Pub. No.: WO2020/257465
PCT Pub. Date: Dec. 24, 2020

(65) Prior Publication Data

US 2022/0325563 A1 Oct. 13, 2022

Related U.S. Application Data

(60) Provisional application No. 62/864,537, filed on Jun. 21, 2019.

(51) Int. Cl.
*E05B 81/06* (2014.01)
*E05B 81/34* (2014.01)
*E05B 83/30* (2014.01)

(52) U.S. Cl.
CPC .............. *E05B 81/06* (2013.01); *E05B 81/34* (2013.01); *E05B 83/30* (2013.01)

(58) Field of Classification Search
CPC ........... E05B 81/06; E05B 81/34; E05B 83/30
(Continued)

(56) References Cited

U.S. PATENT DOCUMENTS 5,911,460 A * 6/1999 Hawkins ............... E05B 63/248 292/144
7,004,517 B2 * 2/2006 Vitry ....................... E05B 81/14 292/216
(Continued)

FOREIGN PATENT DOCUMENTS

CA 2103995 A1 2/1995
CN 105909088 A 8/2016
(Continued)

OTHER PUBLICATIONS

Chinese Office Action with Search Report for Chinese Application No. 202080045612.6, issued May 22, 2023 with translation, 15 pages.
(Continued)

*Primary Examiner* — Kristina R Fulton
*Assistant Examiner* — James Edward Ignaczewski
(74) *Attorney, Agent, or Firm* — Buchanan Ingersoll & Rooney PC

(57) ABSTRACT

An electronic striker for releasing a door or access panel includes a housing defining an opening and a passageway extending from the opening for receiving a pawl on the door or access panel. A plunger is coupled to the housing and is mounted for movement within the passageway. A motor is configured for moving the plunger between a withdrawn position, in which the plunger is withdrawn within the passageway, and a deployed position, in which the plunger is extended within the passageway relative to the withdrawn position. The plunger is configured to move the pawl out of the passageway upon moving the plunger from the withdrawn position to the deployed position, thereby releasing the door or access panel from the passageway.

23 Claims, 18 Drawing Sheets

(58) Field of Classification Search
USPC .......................................................... 292/216
See application file for complete search history.

(56) References Cited

U.S. PATENT DOCUMENTS

| | | | | |
|---|---|---|---|---|
| 7,048,311 | B2 * | 5/2006 | Sawatani | E05B 83/30 292/32 |
| 8,596,704 | B2 | 12/2013 | Sielhorst et al. | |
| 10,081,970 | B2 | 9/2018 | Aselage et al. | |
| 10,378,252 | B2 * | 8/2019 | Ottino | E05B 81/68 |
| 10,767,397 | B2 | 9/2020 | Ottino et al. | |
| 10,822,836 | B2 | 11/2020 | Nakasone | |
| 2011/0265586 | A1 * | 11/2011 | Perkins | E05B 81/34 74/89.14 |
| 2011/0309640 | A1 * | 12/2011 | Matsubara | E05B 63/248 292/159 |
| 2015/0075233 | A1 * | 3/2015 | Pluta | E05B 47/0046 70/129 |
| 2017/0046898 | A1 * | 2/2017 | Cabouli | E05B 17/10 |
| 2020/0386021 | A1 * | 12/2020 | Minnich | E05C 1/006 |

FOREIGN PATENT DOCUMENTS

| | | | | |
|---|---|---|---|---|
| CN | 105909089 | A | 8/2016 | |
| DE | 102004015068 | A1 * | 10/2005 | B60R 7/06 |
| FR | 3021686 | A1 | 12/2015 | |
| JP | 2009269572 | A | 11/2009 | |
| JP | 2016097882 | A * | 5/2016 | |
| JP | 2018001895 | A * | 1/2018 | |
| WO | 2009062791 | A1 | 5/2009 | |
| WO | 2016185973 | A1 | 11/2016 | |

OTHER PUBLICATIONS

International Search Report and Written Opinion for International Application No. PCT/US2020/038450, dated Dec. 7, 2020, 15 pages.

International Preliminary Report on Patentability and Written Opinion for International Application No. PCT/US2020/038450, issued Dec. 21, 2021, 11 pages.

* cited by examiner

ELECTRONIC STRIKER FOR RELEASING A COMPARTMENT DOOR AND METHOD OF USING THE SAME

CROSS REFERENCE TO RELATED APPLICATIONS

This Application is a U.S. national phase application filed under 35 U.S.C. § 371 claiming benefit to International Patent Application No. PCT/US2020/038450, filed Jun. 18, 2020, which is related to, and claims the benefit of priority of U.S. Provisional Application No. 62/864,537, entitled ELECTRONICALLY ACTUATED AND LOCKING GLOVE BOX SYSTEM, filed on Jun. 21, 2019, the contents of which are incorporated herein by reference in their entirety for all purposes.

FIELD OF THE INVENTION

The present invention relates to the field of locks or connector systems configured to provide a mechanical connection between adjacent components, and particularly to locking systems for securing in a closed position and releasing from the closed position automotive glove box or accessory compartment doors.

BACKGROUND OF THE INVENTION

Automotive door closure systems, such as glove boxes and the like, typically include a door housing mounted to a dashboard of the vehicle, a door movably mounted to the door housing, and a lockable latch that cooperates with one or more strikers to hold the door in the closed position to cover the door housing. It has been found that there is a continuing need to improve upon or provide alternatives to existing door closure systems in the interests of convenience.

SUMMARY OF THE INVENTION

According to a first aspect of the present invention, an electronic striker for releasing a door or access panel includes a housing defining an opening and a passageway extending from the opening for receiving a pawl on the door or access panel. A plunger is coupled to the housing and is mounted for movement within the passageway. A motor is configured for moving the plunger between a withdrawn position, in which the plunger is withdrawn within the passageway, and a deployed position, in which the plunger is extended within the passageway relative to the withdrawn position. The plunger is configured to move the pawl out of the passageway upon moving the plunger from the withdrawn position to the deployed position, thereby releasing the door or access panel from the passageway.

According to another aspect of the present invention, a method of using an electronic striker to release a door or access panel from the electronic striker comprises: (i) activating a motor of the electronic striker to move a plunger of the electronic striker from a withdrawn position, in which the plunger is withdrawn within a passageway of the electronic striker, to a deployed position, in which the plunger is extended within the passageway; and (ii) simultaneously moving a pawl of the door or access panel during the activating step from a position in which the pawl is positioned within the passageway to a position in which the pawl is positioned either outside or substantially outside of the passageway, thereby releasing the door or access panel from the passageway.

According to still another aspect of the present invention, an electronic striker for releasing a door or access panel includes a housing defining an opening; a plunger that is coupled to the housing and is mounted for movement with respect to the opening; and a motor configured for moving the plunger between a withdrawn position, and a deployed position, in which the plunger is extended relative to the withdrawn position. The plunger is configured to move the pawl upon moving the plunger from the withdrawn position to the deployed position, thereby releasing the door or access panel.

According to yet another aspect of the present invention, a method of using an electronic striker in a manual override mode to release a door or access panel from the electronic striker comprises: (i) manually moving a plunger of the electronic striker from a withdrawn position, in which the plunger is withdrawn within a passageway, to a deployed position, in which the plunger is extended within the passageway; and (ii) simultaneously moving a pawl of the door or access panel during the manual movement step from a position in which the pawl is positioned within the passageway to a position in which the pawl is positioned either outside or substantially outside of the passageway, thereby releasing the door or access panel from the housing for the door or access panel.

According to yet another aspect of the present invention, a unidirectional worm gear comprises a body and teeth extending outwardly from the body, wherein each tooth has a sloped surface for meshing with a worm and a planar surface opposite the sloped surface.

BRIEF DESCRIPTION OF THE DRAWINGS

The above and other aspects and features of the present invention will become more apparent to those of ordinary skill in the art by describing in detail exemplary embodiments thereof with reference to the attached drawings.

DETAILED DESCRIPTION OF THE INVENTION

Figure 1:
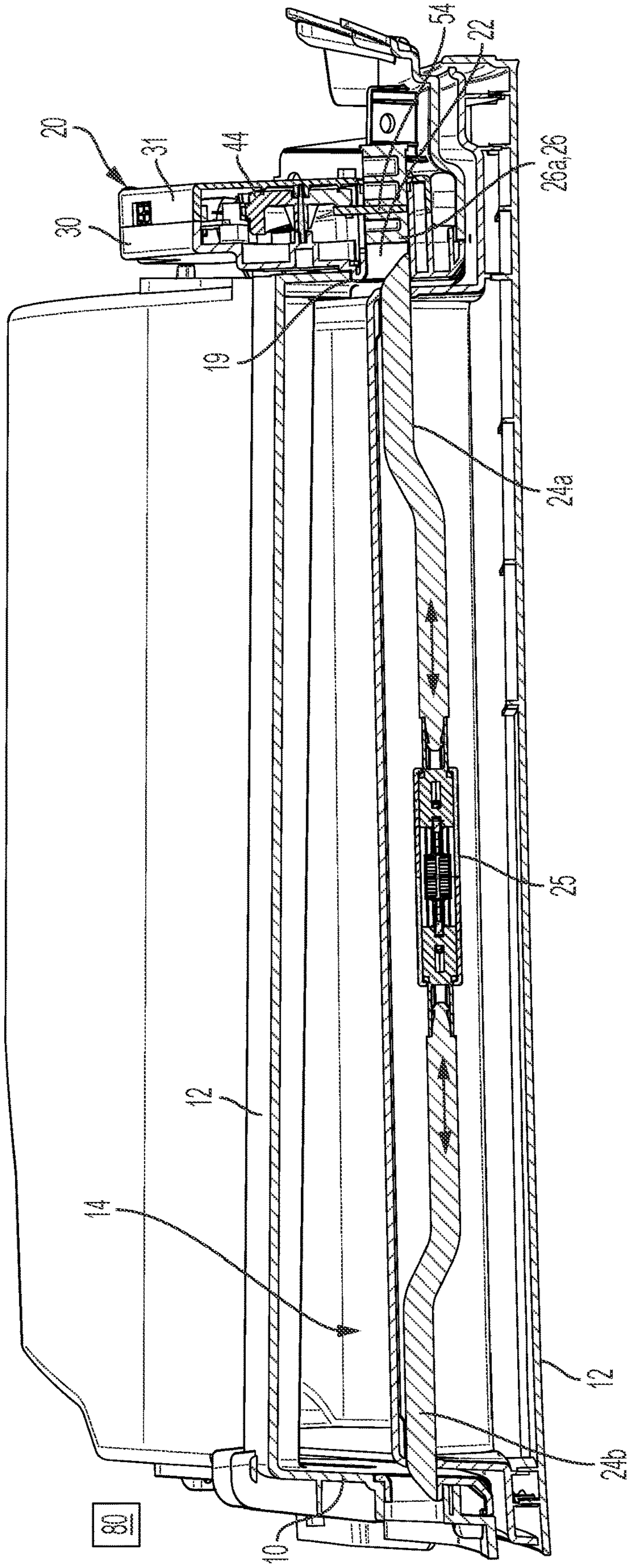
FIG. 1 is a cross-sectional view of a glove box system, wherein a door of the glove box system is shown in a closed state.

Although the invention is illustrated and described herein with reference to specific embodiments, the invention is not intended to be limited to the details shown. Rather, various modifications may be made in the details within the scope and range of equivalents of the claims and without departing from the invention.

Various terms are used throughout the disclosure to describe the physical shape or arrangement of features. A number of these terms are used to describe features that conform to a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to a center axis. The terms "radial" and "radially" refer to a direction, dimension or orientation that is perpendicular to the center axis. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms concerning attachments, coupling and the like, such as "mounted," "connected" and "interconnected," refer to a relationship wherein structures are secured or attached to one another either directly or indirectly through intervening structures, as well as both movable or rigid attachments or relationships, unless expressly described otherwise.

FIG. 1 is a cross-sectional view of a glove box system including a door housing 10, a door 12 that is movably mounted to the door housing 10, and an electronic striker 20 for (i) maintaining the door 12 in a closed and locked state and (ii) releasing the door 12 from the closed and locked state. The door 12 is shown in a closed state in FIG. 1.

The door housing 10 includes a storage space 14, which is accessible to a user when the door 12 is in the open state, and is inaccessible to the user when the door 12 is in the closed state (as shown). The door 12 may also be referred to herein as an access panel. The door housing 10 may be a vehicle glove box or a vehicle center console, for example. The door housing 10 is not limited for use with vehicles.

Figure 2A:
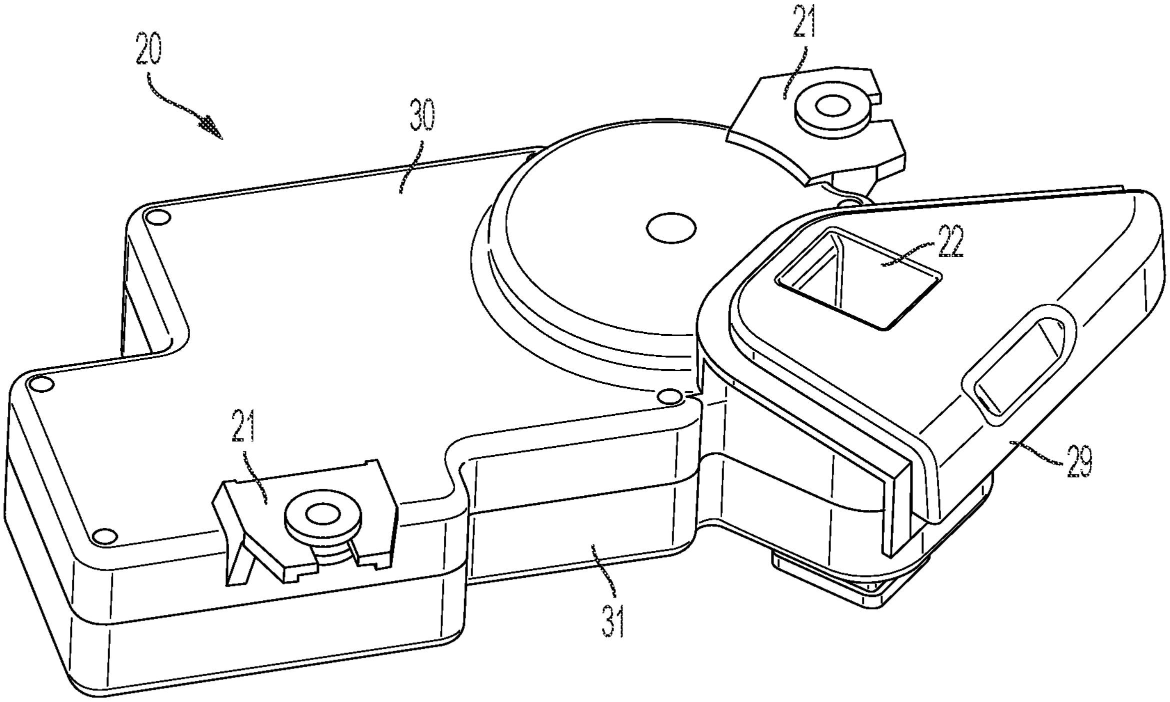
FIG. 2A is a left side isometric view of an electronic striker of the glove box system of FIG. 1, wherein a plunger of the electronic striker is shown in a withdrawn state.
Figure 2B:
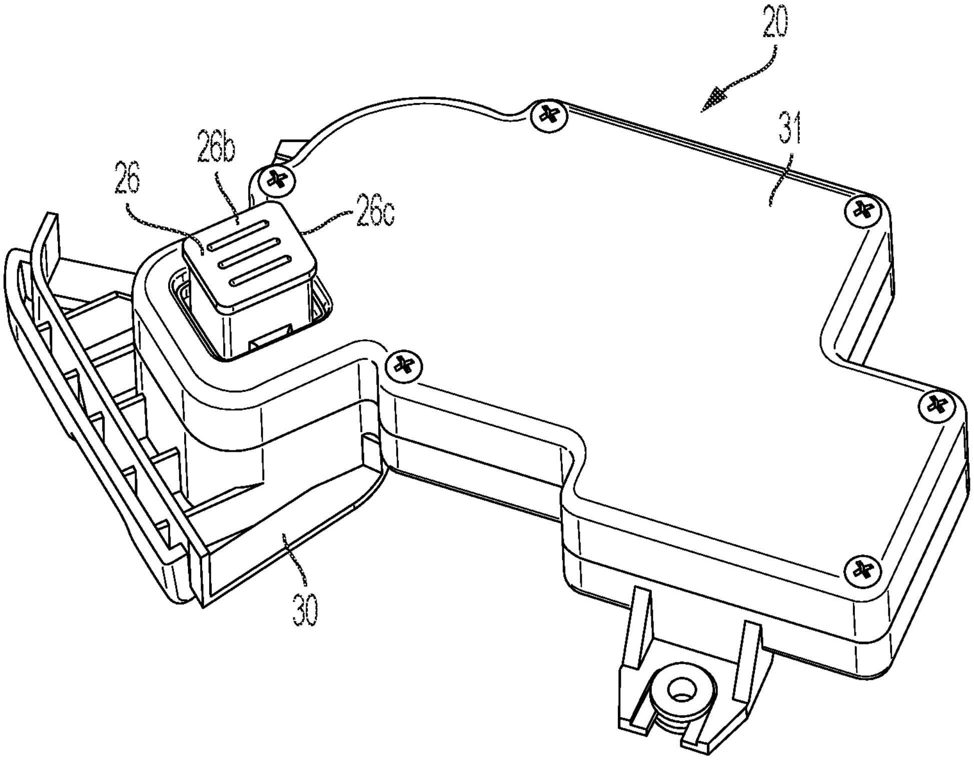
FIG. 2B is a right side isometric view of the electronic striker of FIG. 2A, wherein the plunger of the electronic striker is shown in the withdrawn state.
Figure 2C:
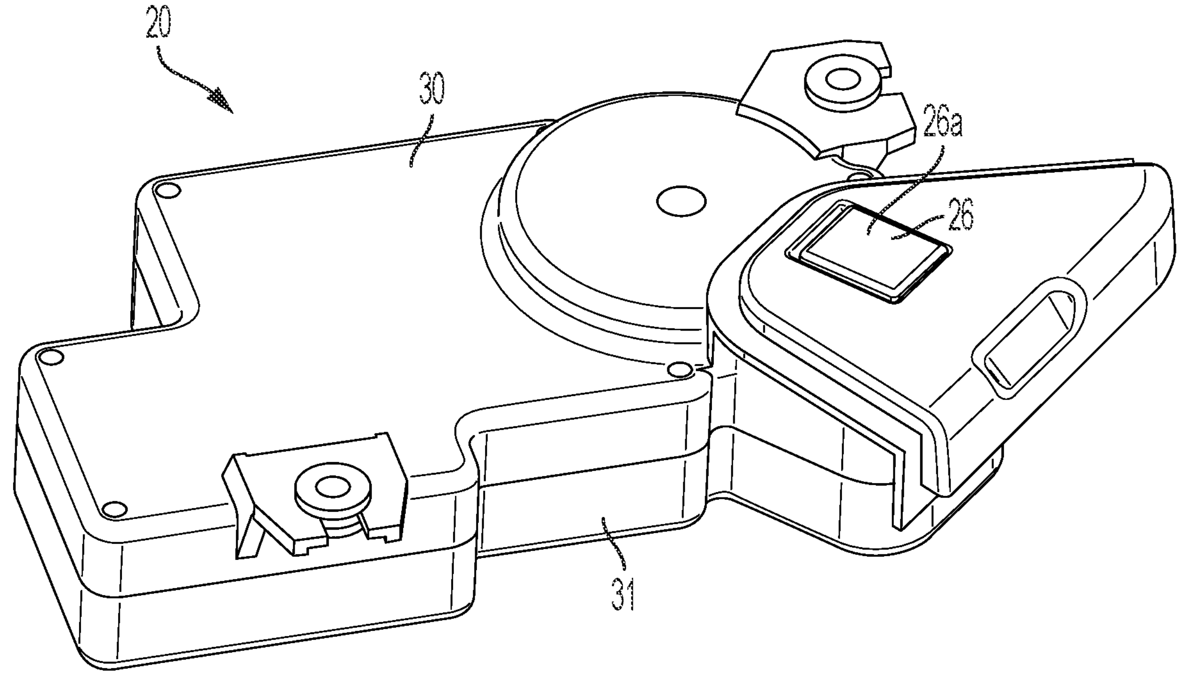
FIG. 2C is a left side isometric view of the electronic striker of FIG. 2A, wherein the plunger of the electronic striker is shown in a deployed state.
Figure 2D:
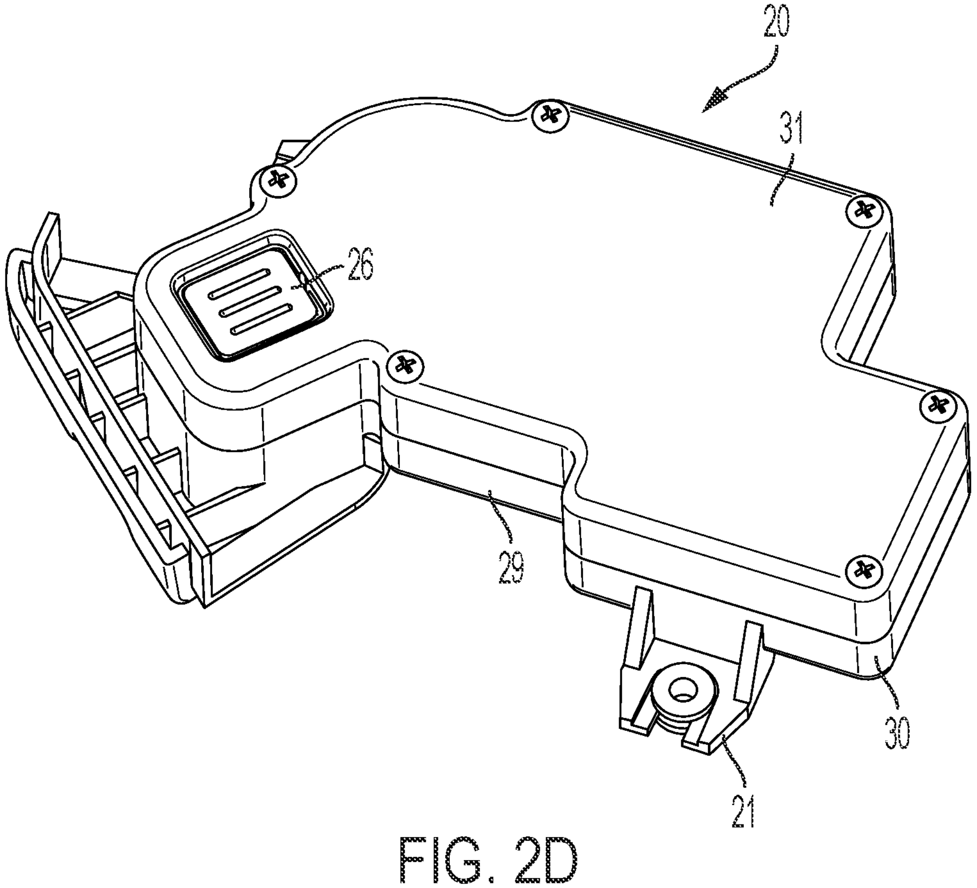
FIG. 2D is a right side isometric view of the electronic striker of FIG. 2C, wherein the plunger of the electronic striker is shown in the deployed state.

The right side of the door housing 10, as viewed in FIG. 1, includes a cutout region that accommodates the electronic striker 20 (also referred to herein as "striker 20"). The striker 20 includes flanges 21 (FIG. 2A) for receiving fasteners for mounting the striker 20 to the door housing 10.

As noted above, the striker 20 is configured to be mounted to the door housing 10 to which either a glove box door 12 or a central console door of a motor vehicle is movably mounted. Alternatively, the striker 20 could be configured to be mounted to the glove box door or the central console door. An exemplary glove box door and door housing are shown in U.S. Pat. No. 10,081,970 to Ford and U.S. Pat. No. 7,004,517 to Southco Inc., each of which is incorporated by reference in its entirety and for all purposes. The striker 20 is configured to retain the door 12 in a latched position, as well as selectively open the door with respect to the door housing 10. The striker 20 is configured for use with various types of doors, and is not limited for use with vehicle glove boxes.

Referring now the features of the electronic striker 20, the striker 20 is shown, in one form or another, in FIGS. 2A-3D. The striker 20 is an assembly comprising a housing 29 including a base 30 and a lid 31 that covers the base 30 and is mounted thereto by fasteners. An interior space is defined between the housing 30 and the lid 31. A series of components, which will now be described, are positioned within the interior space to cause movement of a plunger 26 of the electronic striker 20.

The striker housing 29 includes an opening 19 and a passageway 22 extending from the opening 19. The opening 19 is defined on an exterior surface of the base 30. A plunger 26, which forms part of the electronic striker 20, is movably positioned with the passageway 22.

As shown in FIG. 1, the passageway 22 and plunger 26 together interact with a moveable pawl 24*a* extending outwardly from the door 12. The pawl 24*a* is capable of laterally translating from side to side, as depicted by the arrows in FIG. 1. The other pawl 24*b* moves synchronously with the pawl 24*a* and in an opposite translational direction thereto because the pawls 24 are interconnected together by a geared arrangement 25. The pawls 24*a* and 24*b* form part of a multi-point latching system. Further details of the pawls 24 and their multi-point latching system, including the internal details of the geared arrangement 25, are disclosed in U.S. Patent App. No. 62/599,162 to Minnich, which is incorporated by reference herein in its entirety. It should be understood that the geared arrangement 25 is not limited to the geared arrangement disclosed in U.S. Patent App. No. 62/599,162 to Minnich.

The passageway 22, which is configured for receiving the pawl 24, may be formed in the striker housing 29, as shown. Alternatively, the passageway 22 for receiving the pawl 24 may be formed in a separate component (not shown) that is connected either directly or indirectly to the striker housing 29.

Briefly, in operation, the plunger 26 is controlled to move between withdrawn and deployed positions. The plunger 26 of the striker 20 is shown in the deployed position in FIGS. 2A, 2B, 3A and 3C, whereas the plunger 26 is shown in the withdrawn position in FIGS. 2C, 2D, 3B and 3D.

In the withdrawn position of the plunger 26, which is shown in FIG. 1, the passageway 22 is able to capture and accommodate the pawl 24*a* of the door 12, thereby retaining the door 12 in a closed position (as shown). The door 12 must be moved (e.g., manually) to the closed position in order for the passageway 22 to capture the pawl 24*a* of the door 12, however, although not shown, a motor could automatically move the door 12 to a closed position. Once the door 12 is moved to the closed position while the plunger 26 is maintained in the withdrawn position, the door 12 is held in that position, i.e., the door 12 is locked. When it is desired to unlock the door 12, the electronic striker 20 is operated to move the plunger 26 to the deployed state. Moving the plunger 26 in an outward direction to the deployed position forces the pawl 24*a* to move out of the passageway 22, thereby disconnecting the pawl 24*a* and its door 22 from the electronic striker 20. Immediately thereafter, the door 22 may move to the open position under its own weight. The plunger 26 is then returned to the withdrawn position in which the electronic striker 20 is ready to receive the pawl 24*a* of the door 12.

In this embodiment, the electronic striker 20 is an active component that moves in response to a user instruction, whereas the pawl 24*a* is a passive component that moves in response to movement of the electronic striker 20.

The various active features of the electronic striker 20 will be described hereinafter.

Figure 3A:
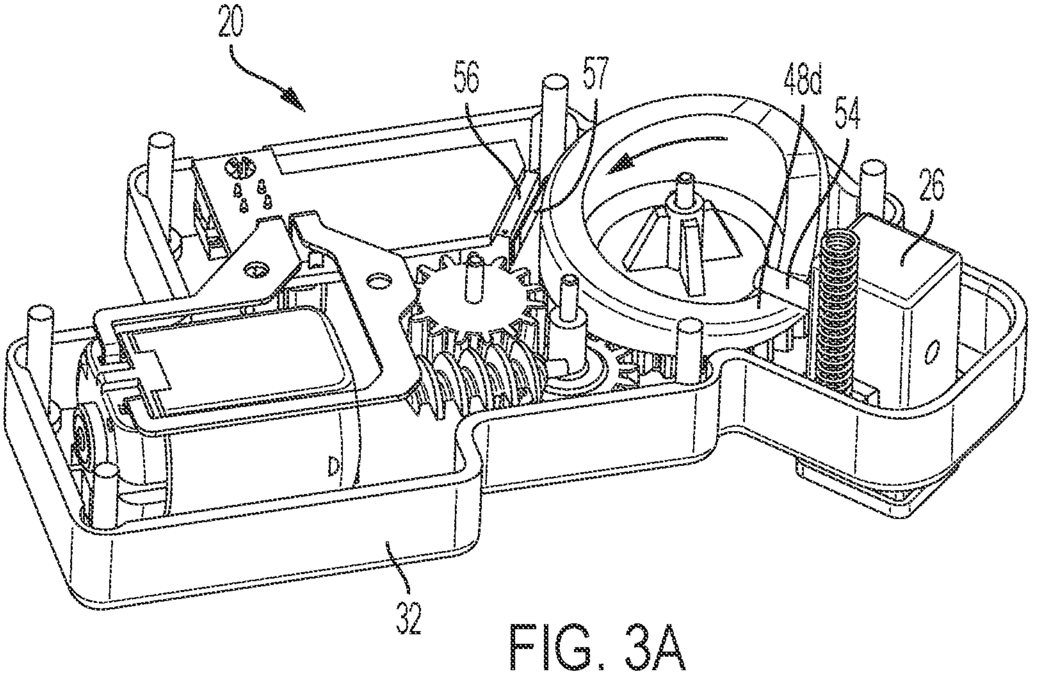
FIG. 3A is an isometric view of the electronic striker of FIG. 2A (i.e., plunger withdrawn) with a base of the electronic striker housing omitted to reveal the internal features of the electronic striker.
Figure 3B:
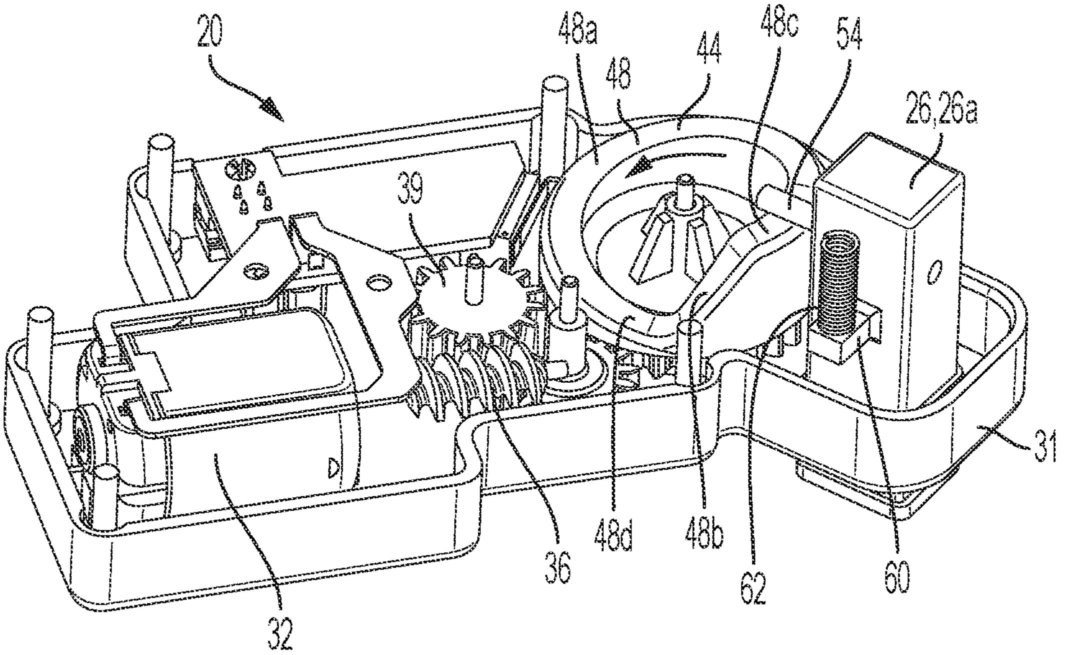
FIG. 3B is an isometric view of the electronic striker of FIG. 2C (i.e., plunger deployed) with the base of the electronic striker housing also omitted to reveal the internal features of the electronic striker.
Figure 3C:
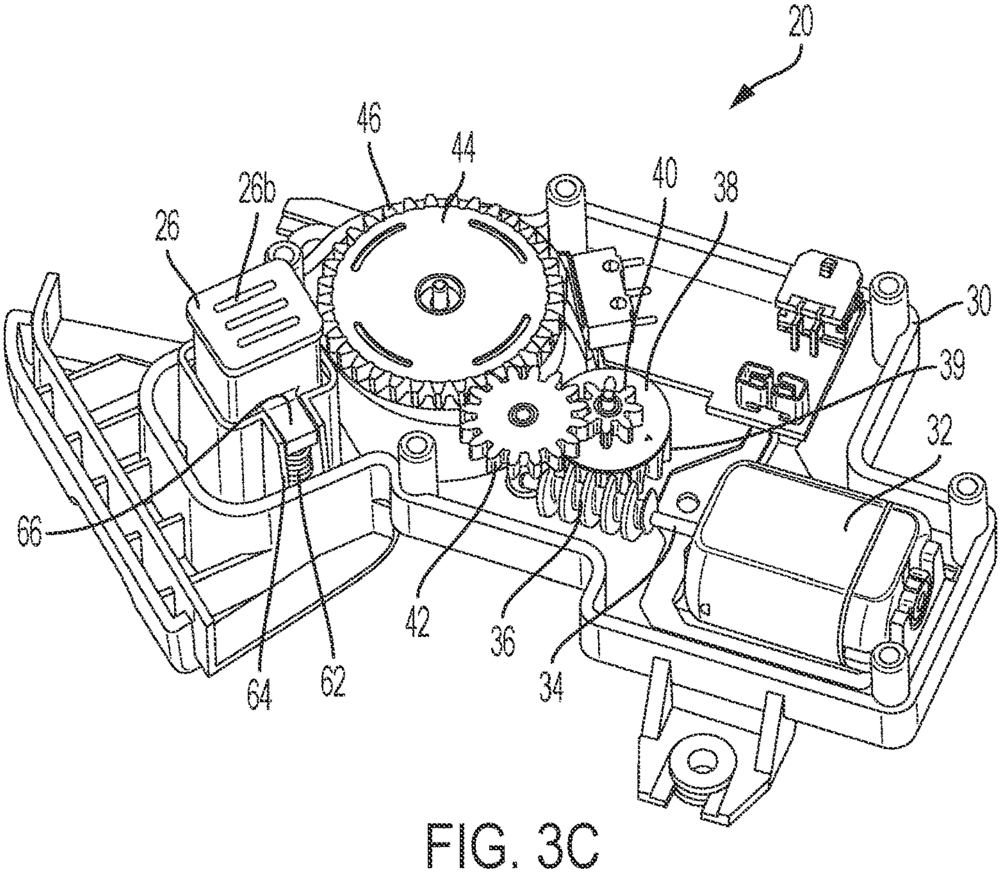
FIG. 3C is an isometric view of the electronic striker of FIG. 2A (i.e., plunger withdrawn) with a lid of the electronic striker housing omitted to reveal the internal features of the electronic striker.
Figure 3D:
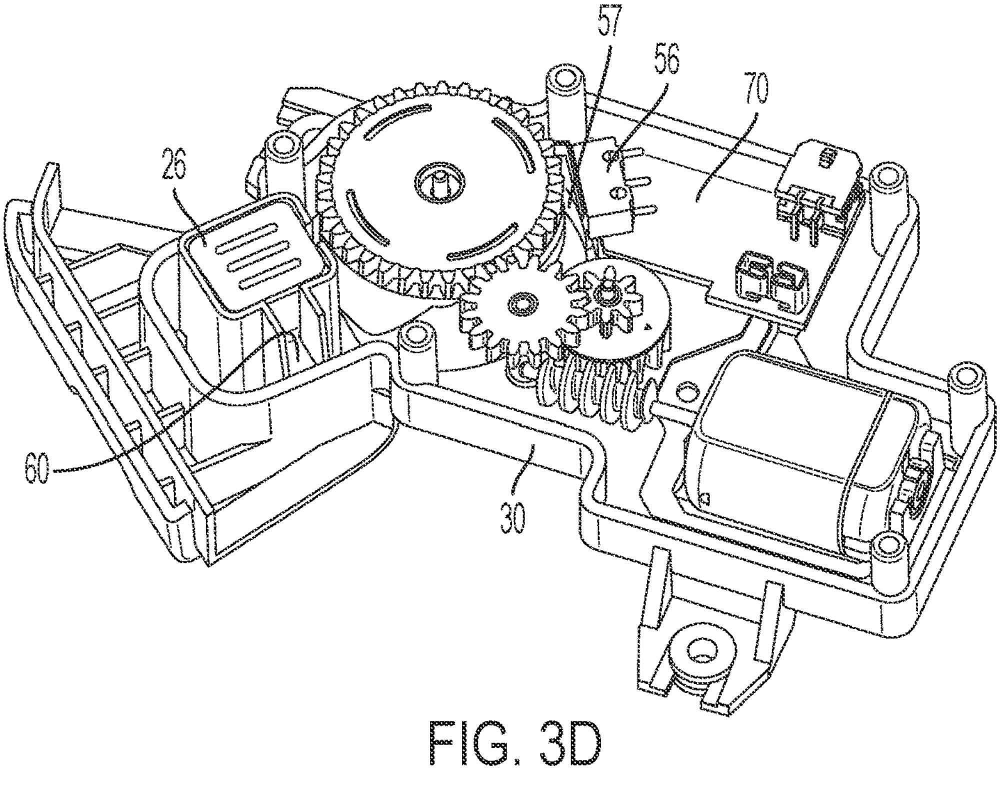
FIG. 3D is an isometric view of the electronic striker of FIG. 2C (i.e., plunger deployed) with the lid of the electronic striker housing also omitted to reveal the internal features of the electronic striker.

Referring now to FIG. 3C, an electric motor 32 of the striker 20 is mounted to the base 30. The motor 32 has a rotatable output shaft 34, and a worm 36 that is connected to the output shaft 34. The worm 36 is non-rotatably connected to the output shaft 34 such that the worm 36 rotates along with the output shaft 34. The teeth of the worm 36 mesh with a lower set of teeth 39 of a worm gear 38. An upper set of teeth 40 of worm gear 38 mesh with the teeth of a transfer gear 42. The teeth of the transfer gear 42 also mesh with teeth 46 of a cam lifter gear 44. A series of shafts support each gear 38, 42 and 44, and those shafts are fixedly mounted to the base 30.

In operation, it should be understood that rotation of output shaft 34 causes rotation of worm 36, which causes rotation of worm gear 38, which causes rotation of transfer gear 42, which causes rotation of cam lifter gear 44. The gears 36, 38, 42 and 44 may be referred to herein as a gear arrangement.

Referring now to FIGS. 5A-5E, the teeth 39 of the worm gear 38 include a simple draft for easy molding. Thus, a spiral ejector mechanism is not required for forming the teeth 39. By way of background, in a traditional worm gear, each tooth has sloped faces on both sides thereof for engaging with a worm in two different rotational directions. One set of sloped surfaces engage with the worm in one rotational direction of the worm, and the other set of sloped surfaces engage with the worm in an opposite rotational direction of the worm. In the worm gear 38, each tooth 39 has only one sloped face 41. The sloped face 41 may be either curved or helical. The face 43 opposing the sloped face is substantially planar. The simple geometry of the teeth 39 is made possible because the gear 38 rotates in a single direction, thus, only the sloped face 41 is required for engaging with the teeth of the worm 36. The face 43 does not necessarily engage with the teeth of the worm 36. Also, the teeth 39 do not overlap in a circumferential direction of the worm gear 38.

Referring now to FIGS. 4A-4G and 3B, the cam lifter gear 44 includes the aforementioned teeth 46 on a lower outer circumference thereof, a cam surface 48 on an upper surface thereof, and a protrusion 50 extending radially outward along (only) a portion of the outer circumference of the gear 44.

The cam surface 48 is a single continuous surface that rises and falls in a direction that is parallel to an axis of rotation of the gear 44. The cam surface 48 includes a gently sloping surface 48*a* which is followed by and joined to a rapidly sloping surface portion 48*b*, as viewed in a circumferential direction and along the axis of rotation. The gently sloping surface 48*a* slopes in an upward direction toward the top end of the gear 44, whereas the rapidly sloping surface portion 48*b* slopes in a downward direction toward the bottom end of the gear 44 (i.e., toward teeth 46), as viewed in a circumferential direction. The absolute value of the slope of portion 48*b* is greater than that of the portion 48*a*. The gently sloping surface 48*a* constitutes about 75% (or more) of the circumference of the gear 44, whereas the rapidly sloping surface portion 48*b* constitutes about 25% (or less) of the circumference of the gear 44. Stated differently, rapidly sloping surface portion 48*b* constitutes about 90 degrees of the circumference of the cam surface 48, and the portion 48*a* constitutes about 270 degrees. As will be described later, the cam surface 48 of the gear 44 interacts with a pin 54 extending from the plunger 26 for translating the spring-loaded plunger 26 in an outward direction that is parallel to the axis of rotation of the gear 44.

The protrusion 50 of the gear 44 is an indexed surface comprising a ramp having a curved entrance surface 50*a*, a flat travel surface and a curved exit surface, as viewed in a circumferential direction. As will be described later, the protrusion 50 interacts with a wiper 57 (FIG. 3A) of an electronic switch 56 to control rotation of the motor 32, and thereby controlling movement of the plunger 26.

The protrusion 50 may be referred to herein as an indexing means. As an alternative to the protrusion, those skilled in the art will recognize that the indexing means could be a surface, recess, marking, magnet, circuit, magnetic feature, optical feature, post, slot, or pin, for example, or any other feature on the gear 44 that can be used for tracking movement of the gear 44. Also, the indexing means could be provided on a different gear of the gear arrangement.

Referring now to FIGS. 3B and 3C, the plunger 26 of the electronic striker 20 is an elongated rectangular body having a top surface 26*a*, an opposing bottom surface 26*b*, and four elongated sidewalls extending between the top surface 26*a* and the bottom surface 26*b*. The bottom surface 26*b* includes a flange 26*c* that extends about the perimeter. A square peg 60 extends perpendicularly from one of the elongated sidewalls of the plunger 26. The peg 60 is sized and configured to travel within a slot 64 formed in the base 30. The slot 64 prevents rotation of the plunger 26. A stop 66 is disposed within the slot 64 to prevent the plunger 26 from moving further than the withdrawn position and becoming detached from the base 30. Similarly, a stop surface is also formed on the base 30 to prevent the plunger 26 from moving further than the deployed position and becoming detached from the base 30. The plunger 26 is configured to translate in a direction that is (i) parallel to an axis of rotation of the gear 44, and, (ii) optionally, for space saving purposes, perpendicular to an axis of rotation of the output shaft 34 of the motor 32.

A pin 54 extends perpendicularly from another one of the elongated sidewalls of the plunger 26. The pin 54 is positioned to extend over the cam surface 48 of the gear 44. Rotation of the cam surface 48 causes translation of the pin 54 and its plunger 26, as will be described in greater detail later. For that reason, the cam surface 48 may be referred to herein as a cam, and the pin 54 may also be referred to herein as a cam follower.

A compression spring 62 is positioned within the slot 64 along with the peg 60. The spring 62 is either mounted to or bears on a protrusion 63 on a lower surface of the peg 60. Specifically, one end of the spring 62 bears on the protrusion 63, and the opposing end of the spring 62 bears on a similar peg or other surface defined on the base 30, thereby captivating the spring 62 within the slot 64. The spring 62 is biased to move the peg 60 (and, therefore, the plunger 26) toward the withdrawn state shown in FIG. 1. The spring 62 is also biased to move the pin 54 against the cam surface 48 of the gear 44.

Figure 3E:
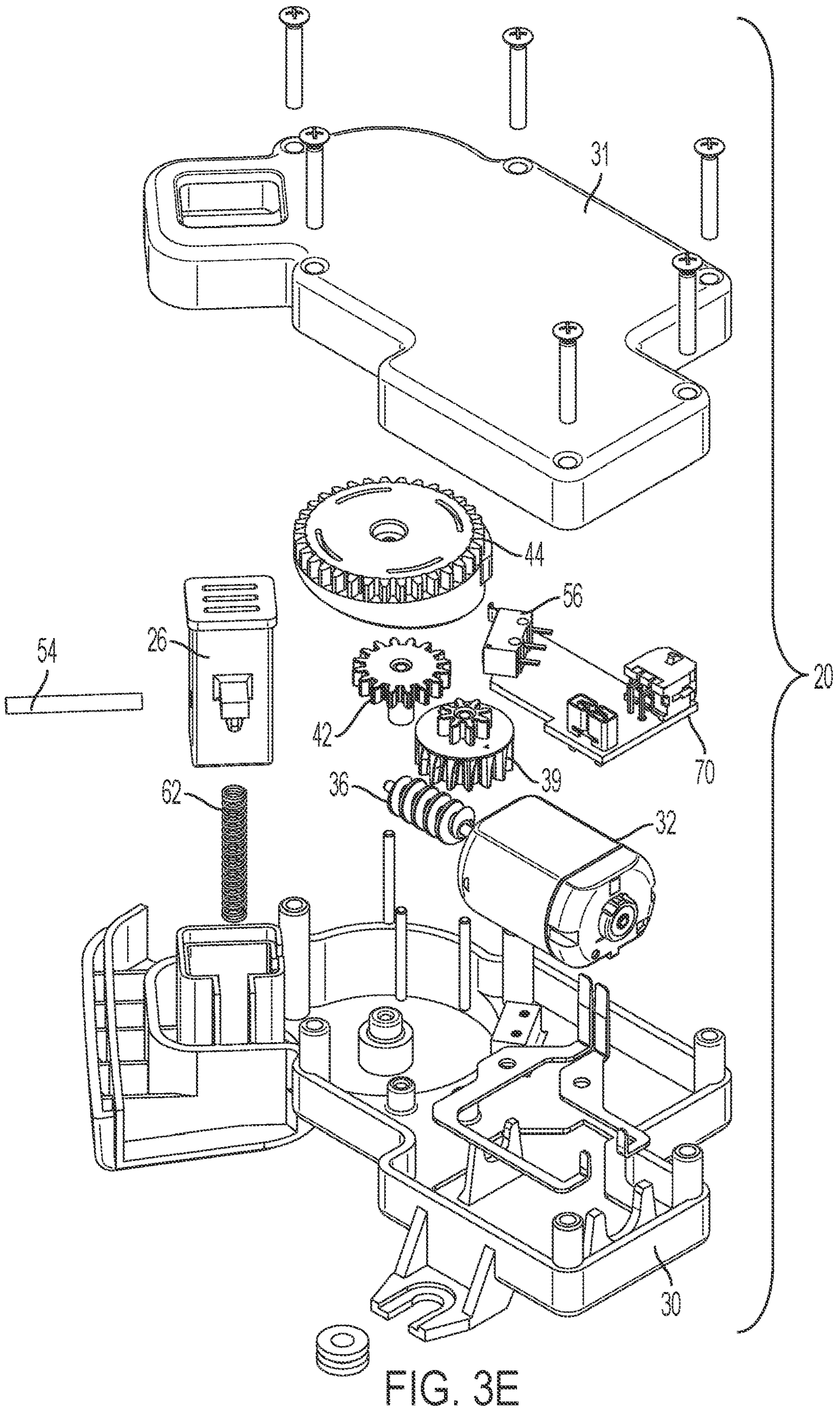
FIG. 3E is an exploded view of the electronic striker of FIG. 2A.
Figure 4A:
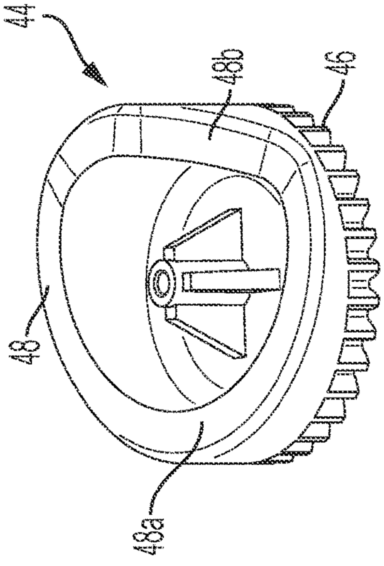
FIGS. 4A-4G depict views of the cam lifter gear of the electronic striker of FIG. 2A.
Figure 4B:
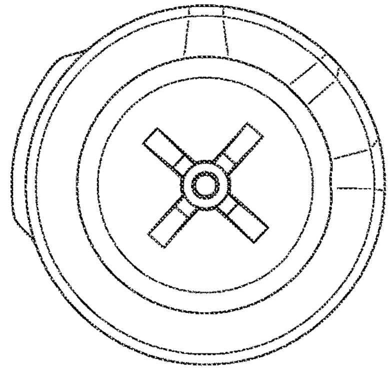
Figure 4C:
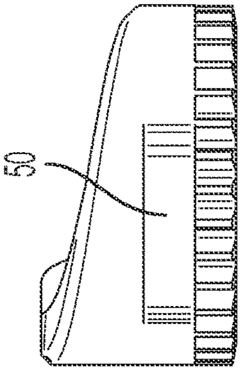
Figure 4D:
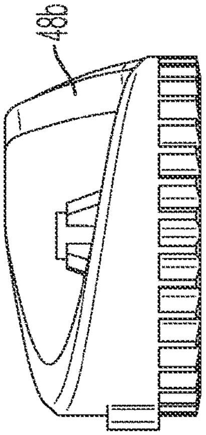
Figure 4E:
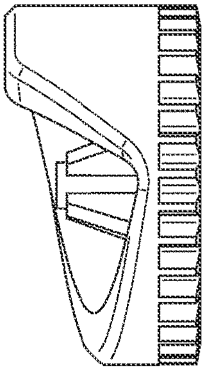
Figure 4F:
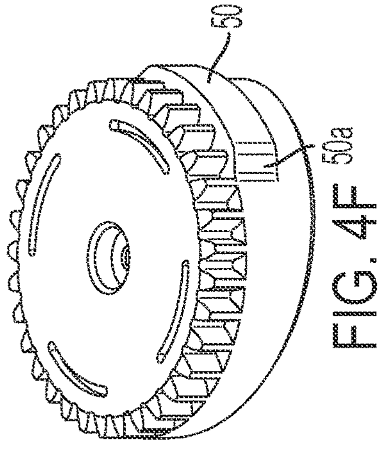
Figure 4G:
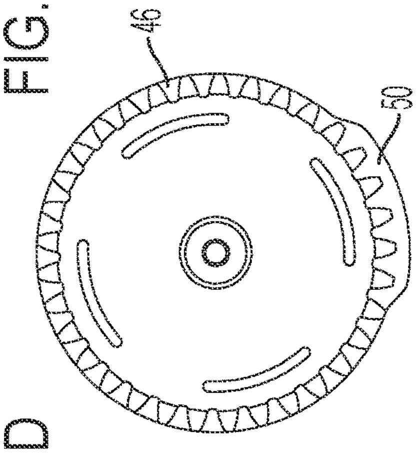
Figure 5A:
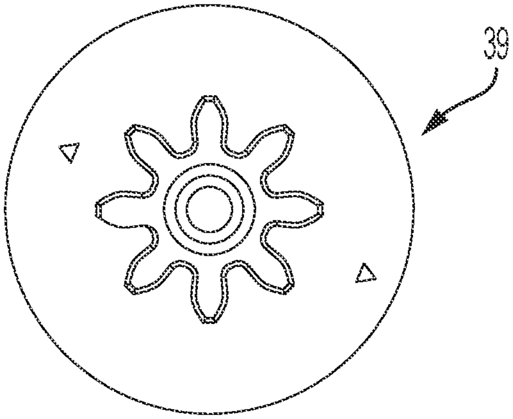
FIGS. 5A-5E depict views of the worm gear of the electronic striker of FIG. 2A.
Figure 5B:
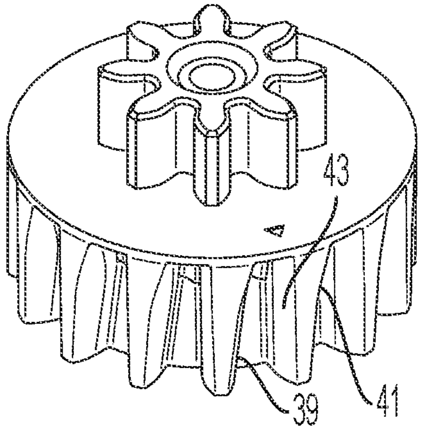
Figure 5C:
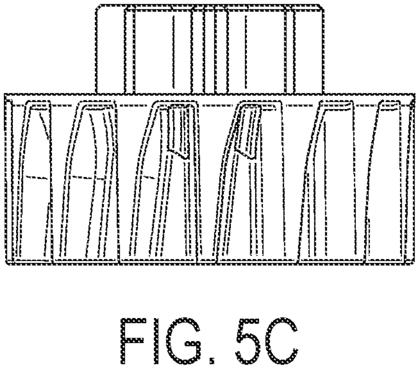
Figure 5D:
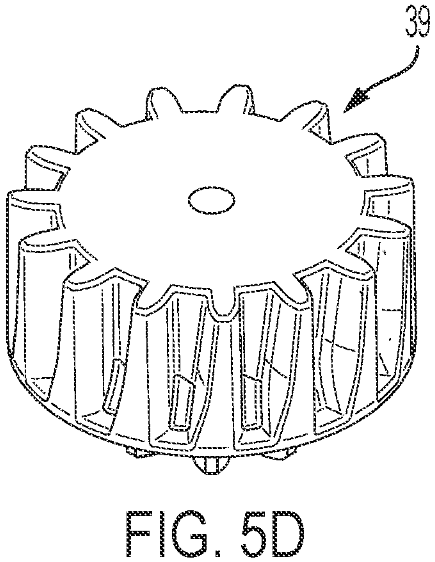
Figure 5E:
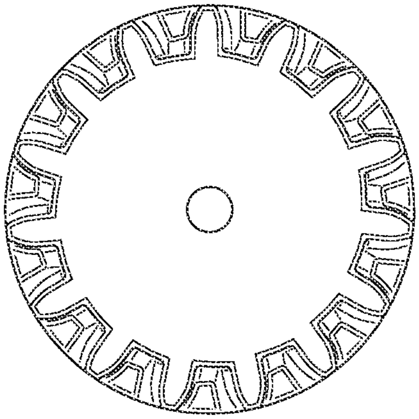
Figure 6C:
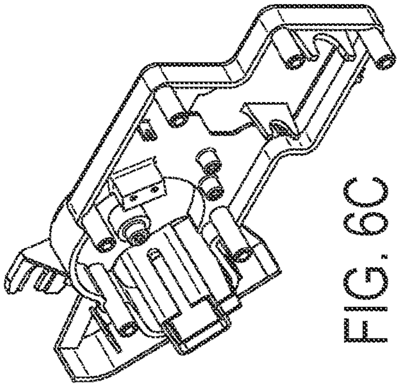
FIGS. 6A-6I depict views of the housing base of the electronic striker of FIG. 2A.
Figure 6B:
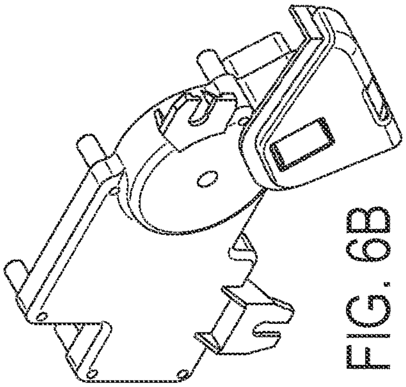
Figure 6G:
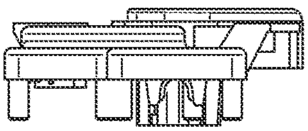
Figure 6F:
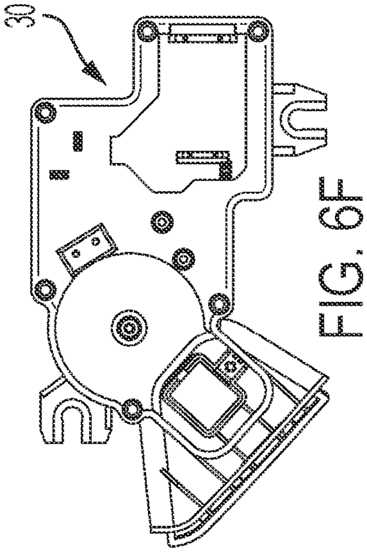
Figure 6E:
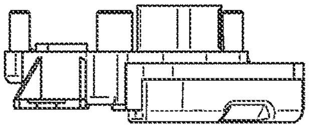
Figure 6I:
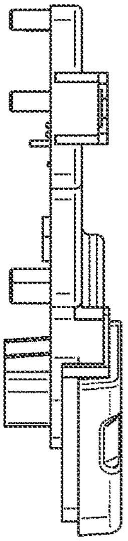
Figure 6A:
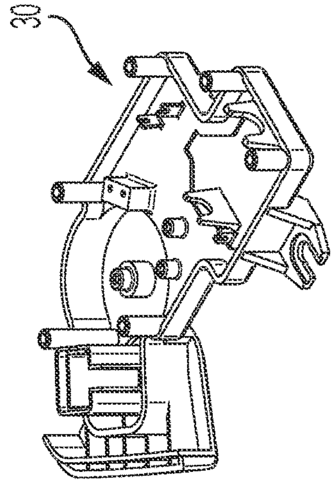
Figure 6D:
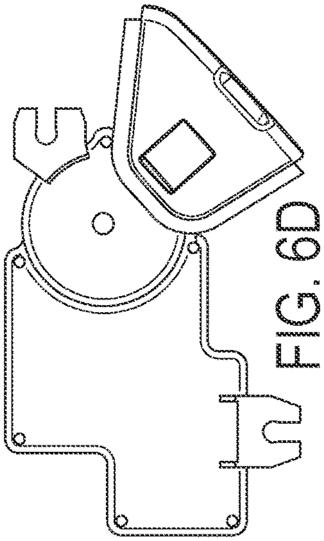
Figure 6H:
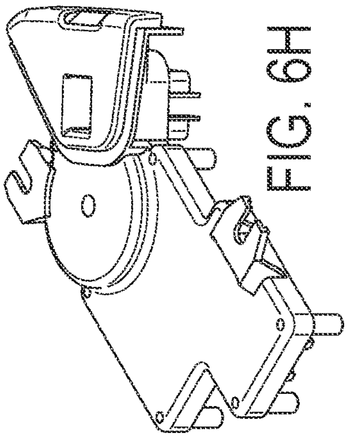
Figure 7B:
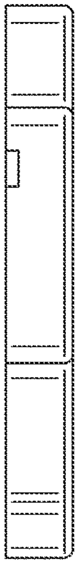
FIGS. 7A-7H depict views of the housing lid of the electronic striker of FIG. 2A.
Figure 7E:
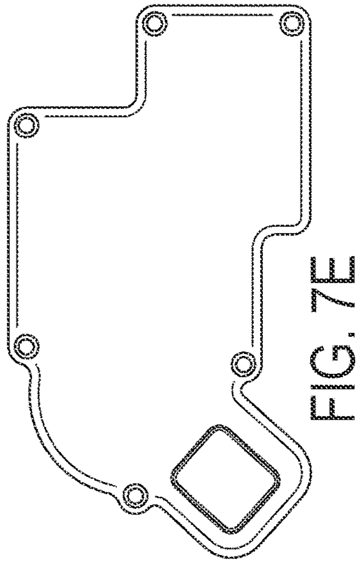
Figure 7H:
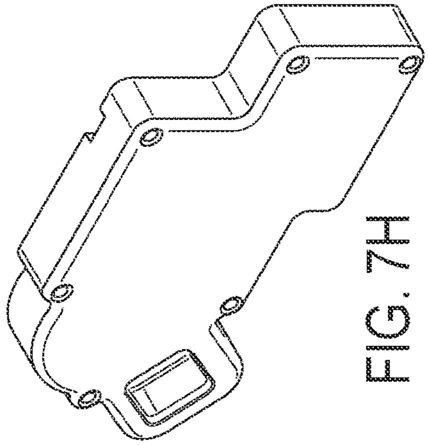
Figure 7D:
Figure 7G:
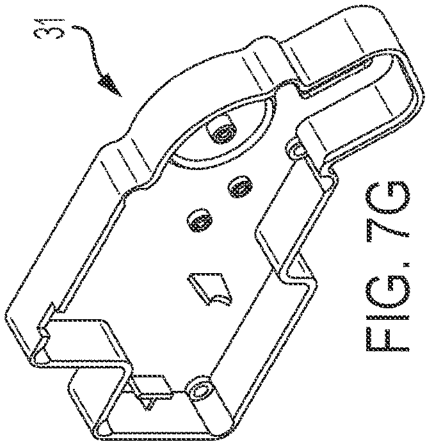
Figure 7A:
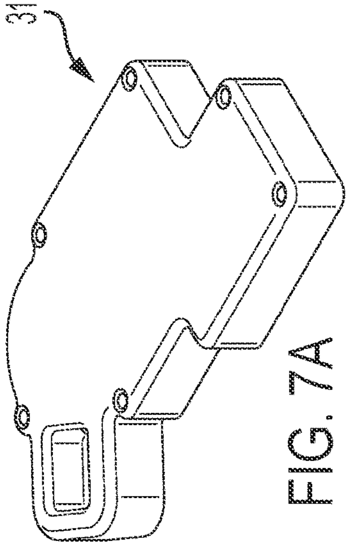
Figure 7C:
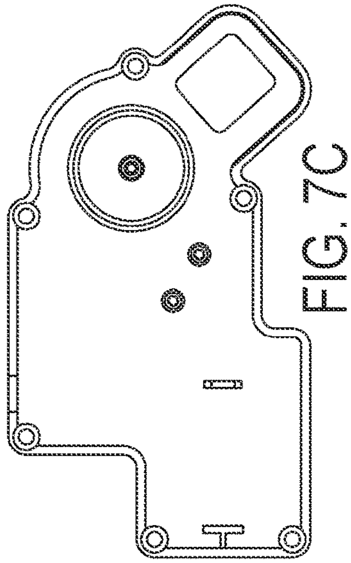
Figure 7F:
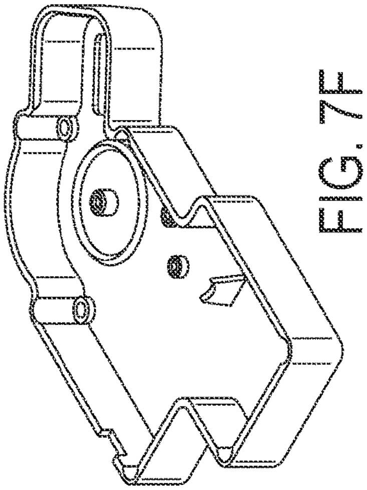
Figure 8C:
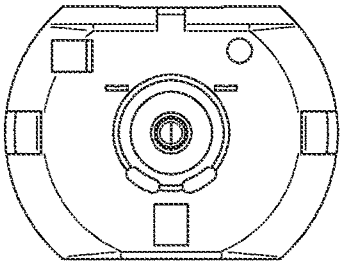
FIGS. 8A-8E depict views of the motor and the worm of the electronic striker of FIG. 2A.
Figure 8E:
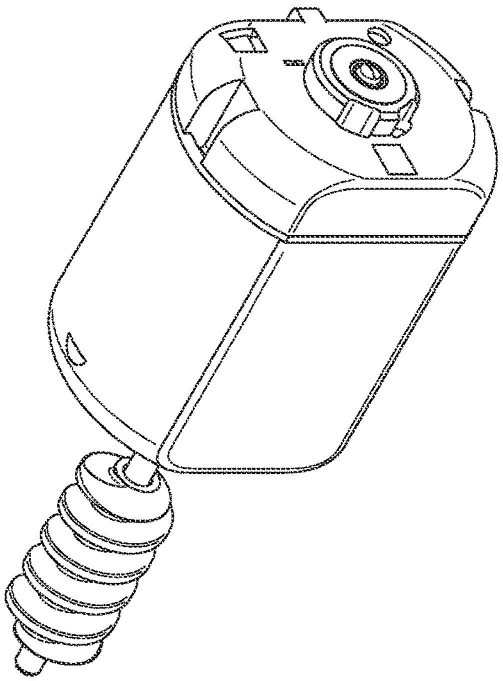
Figure 8B:
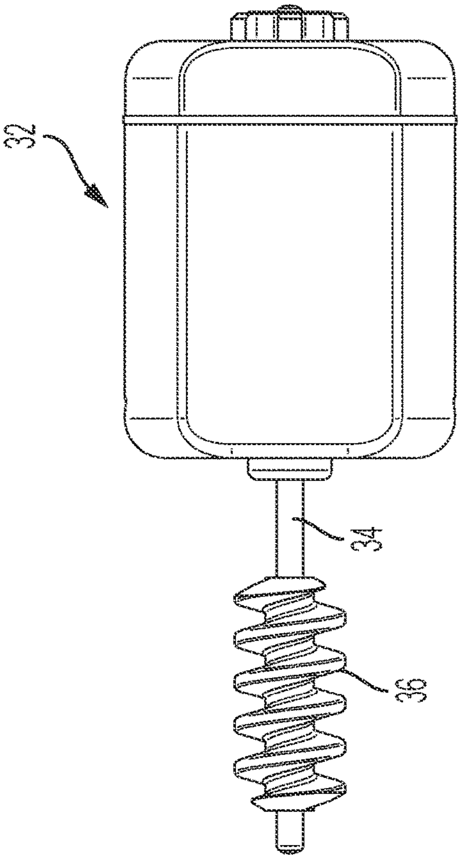
Figure 8D:
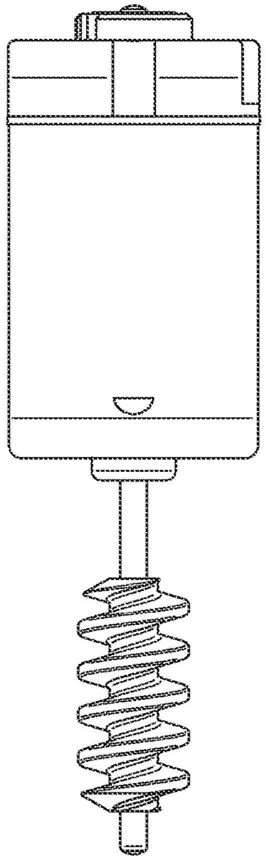
Figure 8A:
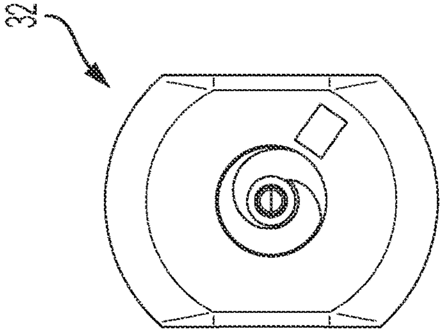
Figure 9A:
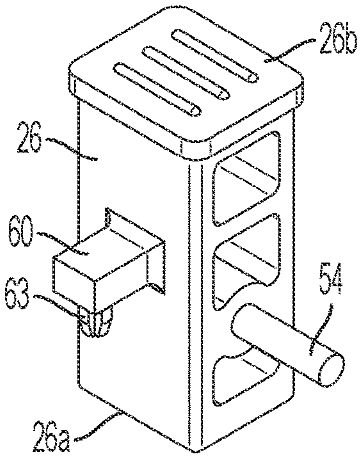
FIGS. 9A-9G depict views of the plunger of the electronic striker of FIG. 2A.
Figure 9B:
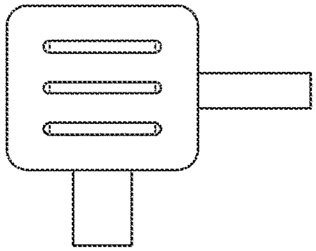
Figure 9C:
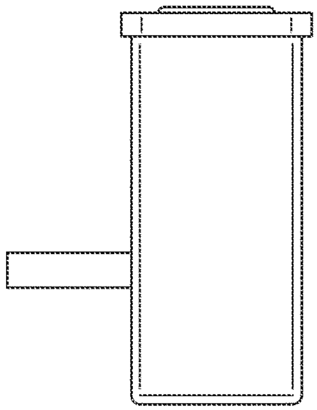
Figure 9D:
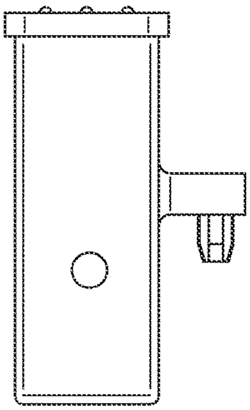
Figure 9E:
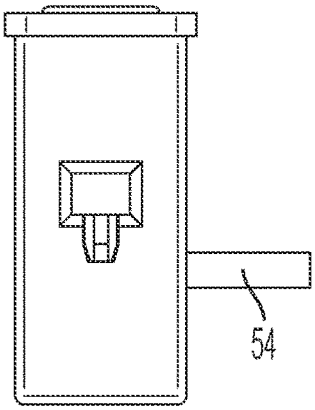
Figure 9F:
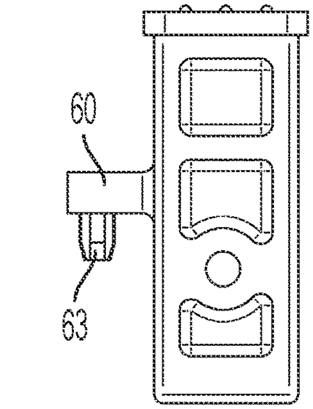
Figure 9G:
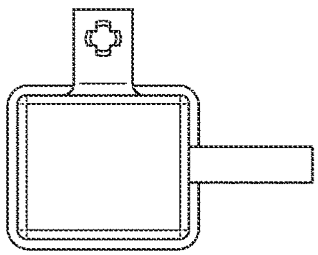
Figure 10A:
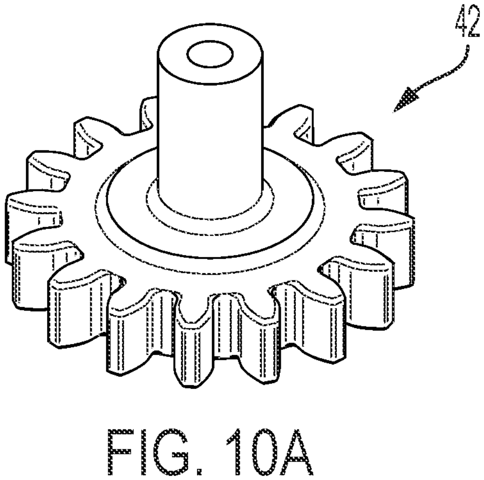
FIGS. 10A-10E depict views of the transfer gear of the electronic striker of FIG. 2A.
Figure 10B:
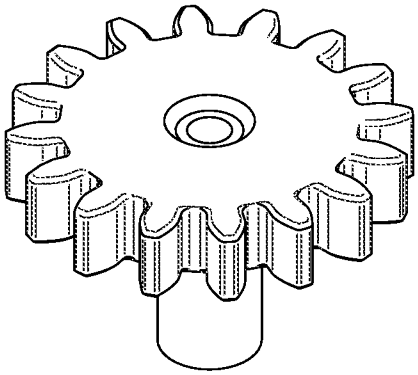
Figure 10C:
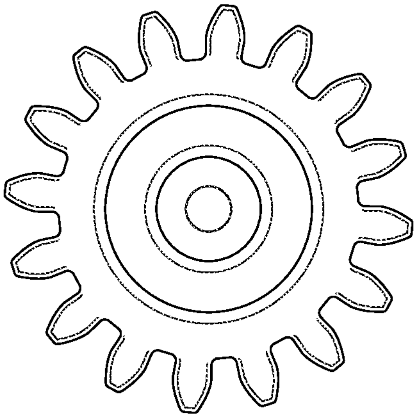
Figure 10D:
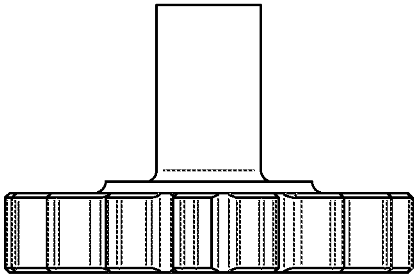
Figure 10E:
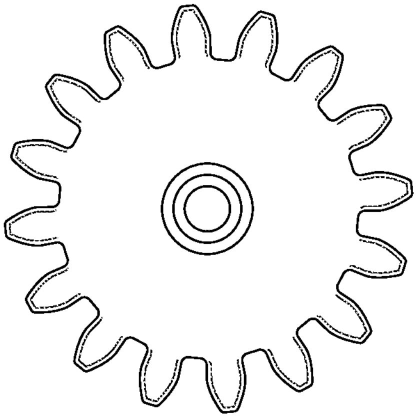

The electronic switch 56 is configured to detect rotation of the gear 44, and communicate one or more rotational positions of the gear 44 to a processor and/or controller of the striker 20. The switch 56, processor and/or controller may be disposed on a circuit board 70 as shown in FIGS. 3C and 3E. The circuit board 70 may additionally include memory, a power source, and/or a receiver/transmitter. The switch 56 may be generally referred to as a sensor, and the switch 56 may be substituted by a rotary encoder, Hall-effect sensor, a Linear Variable Differential Transformer (LVDT), potentiometer, optical proximity sensor, transducer, eddy-current sensor, or photodiode, for example.

Figure 11A:
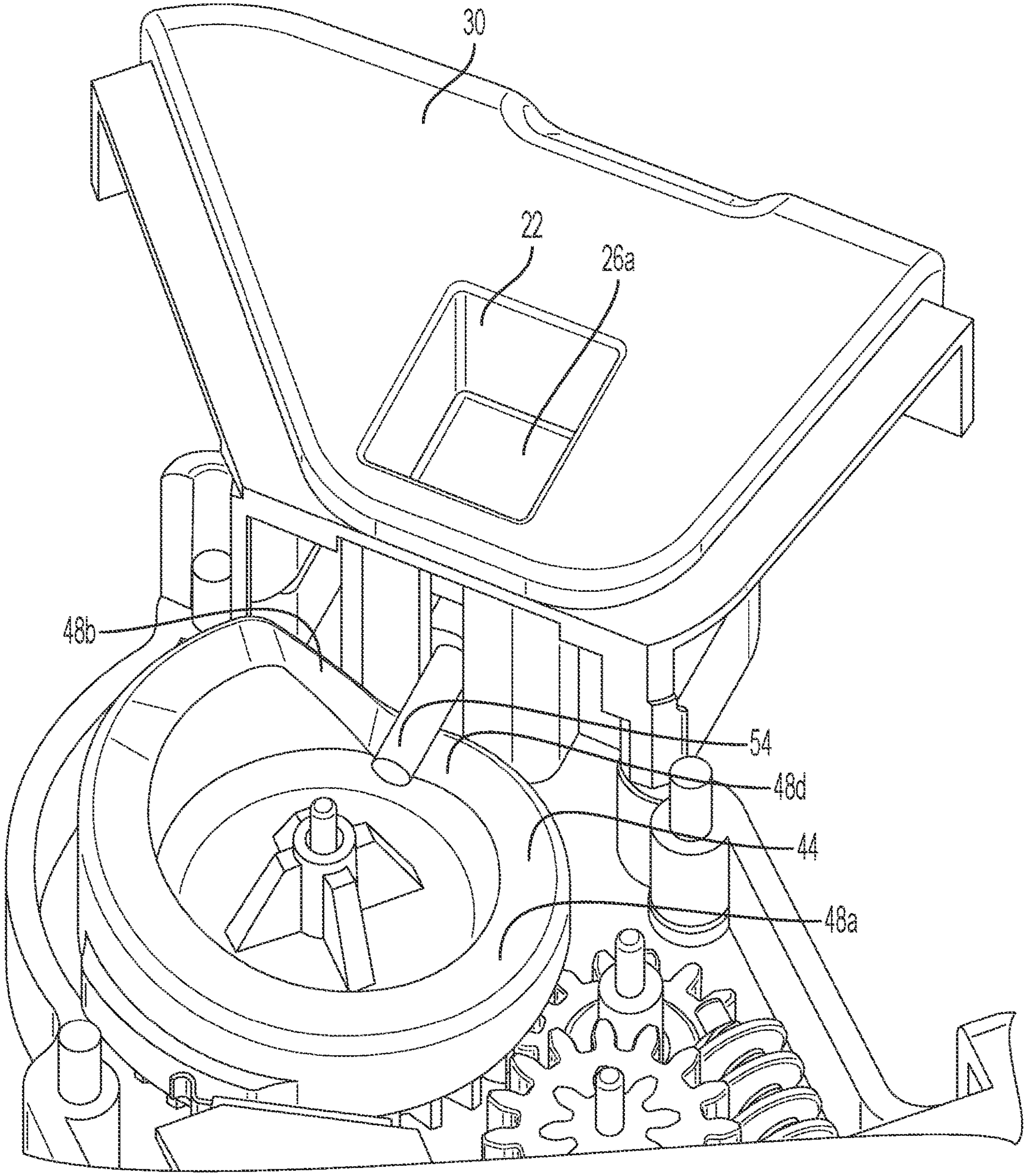
FIGS. 11A-11E depict a detailed view of the electronic striker of FIG. 2A, wherein the views depict sequential movement of the plunger from the withdrawn position, to the deployed position and back towards the withdrawn position.
Figure 11B:
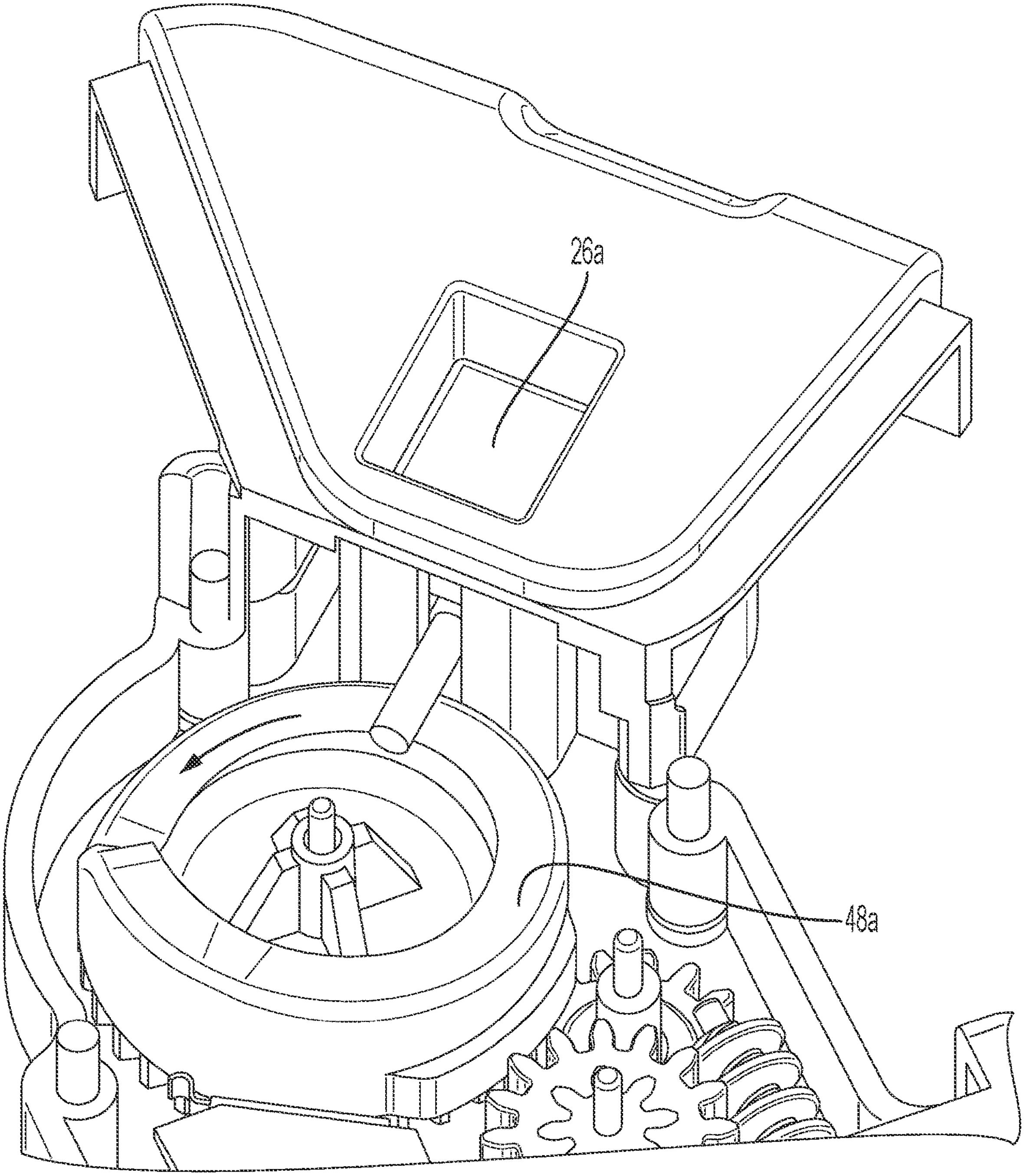
Figure 11C:
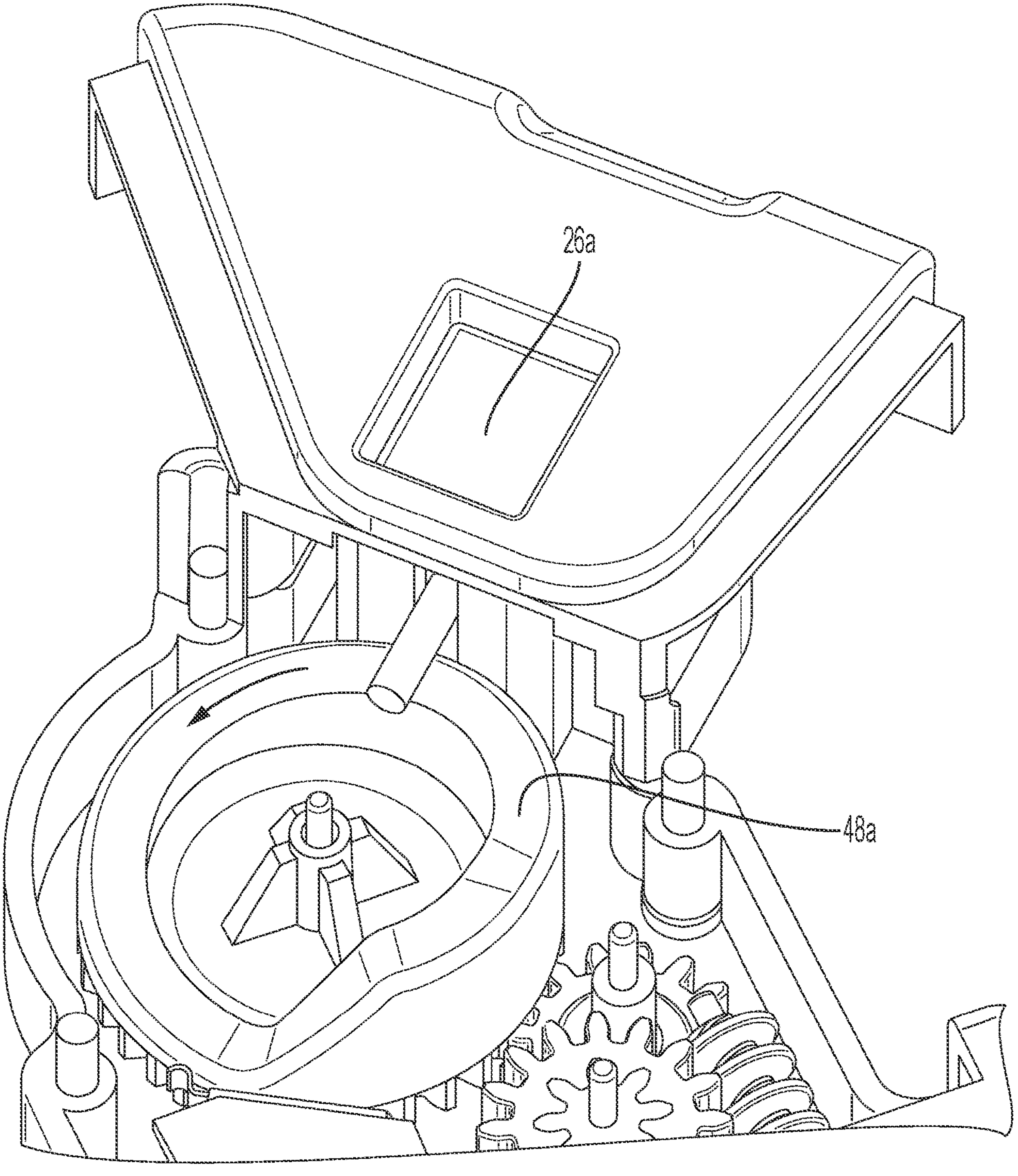
Figure 11D:
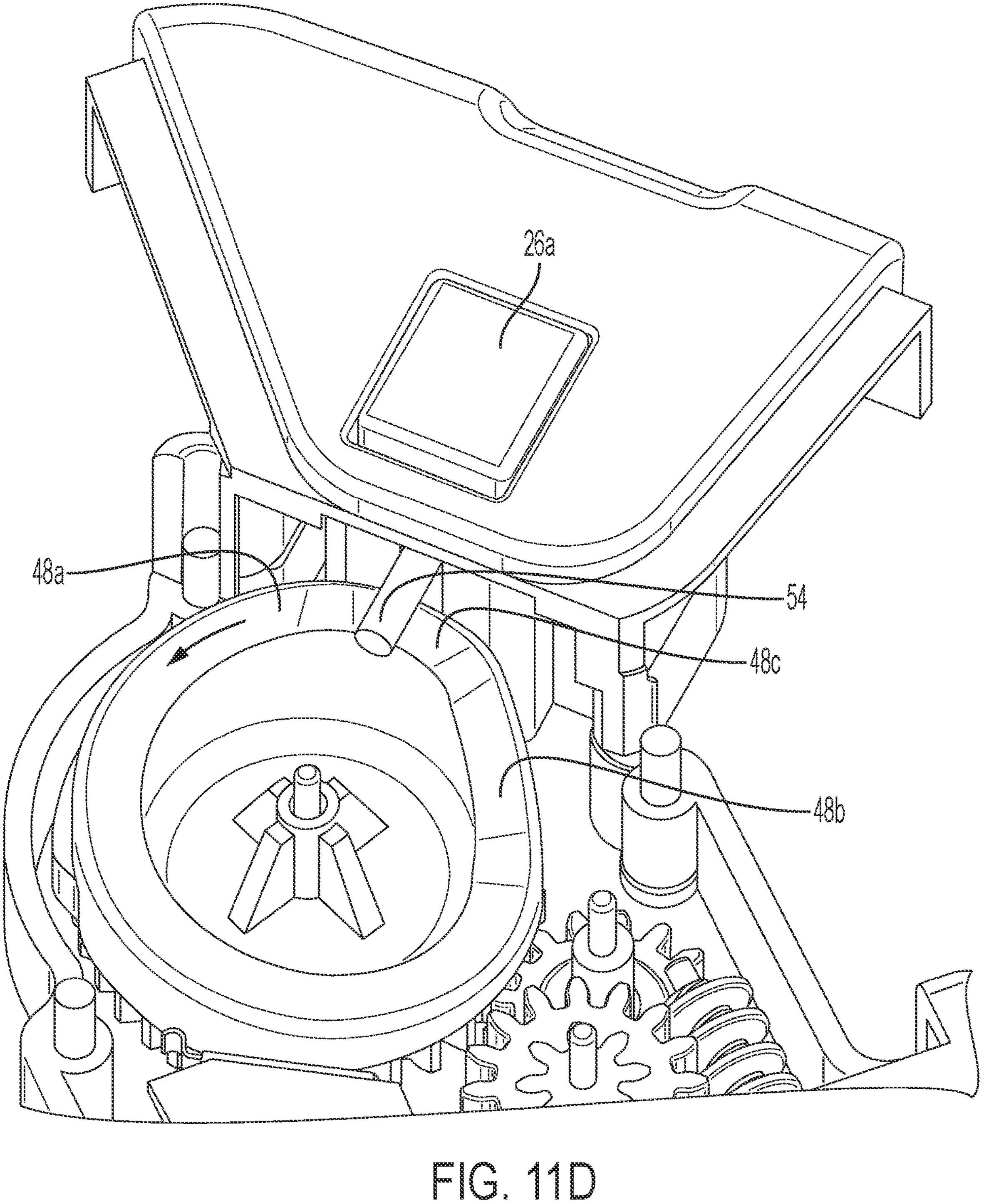
Figure 11E:
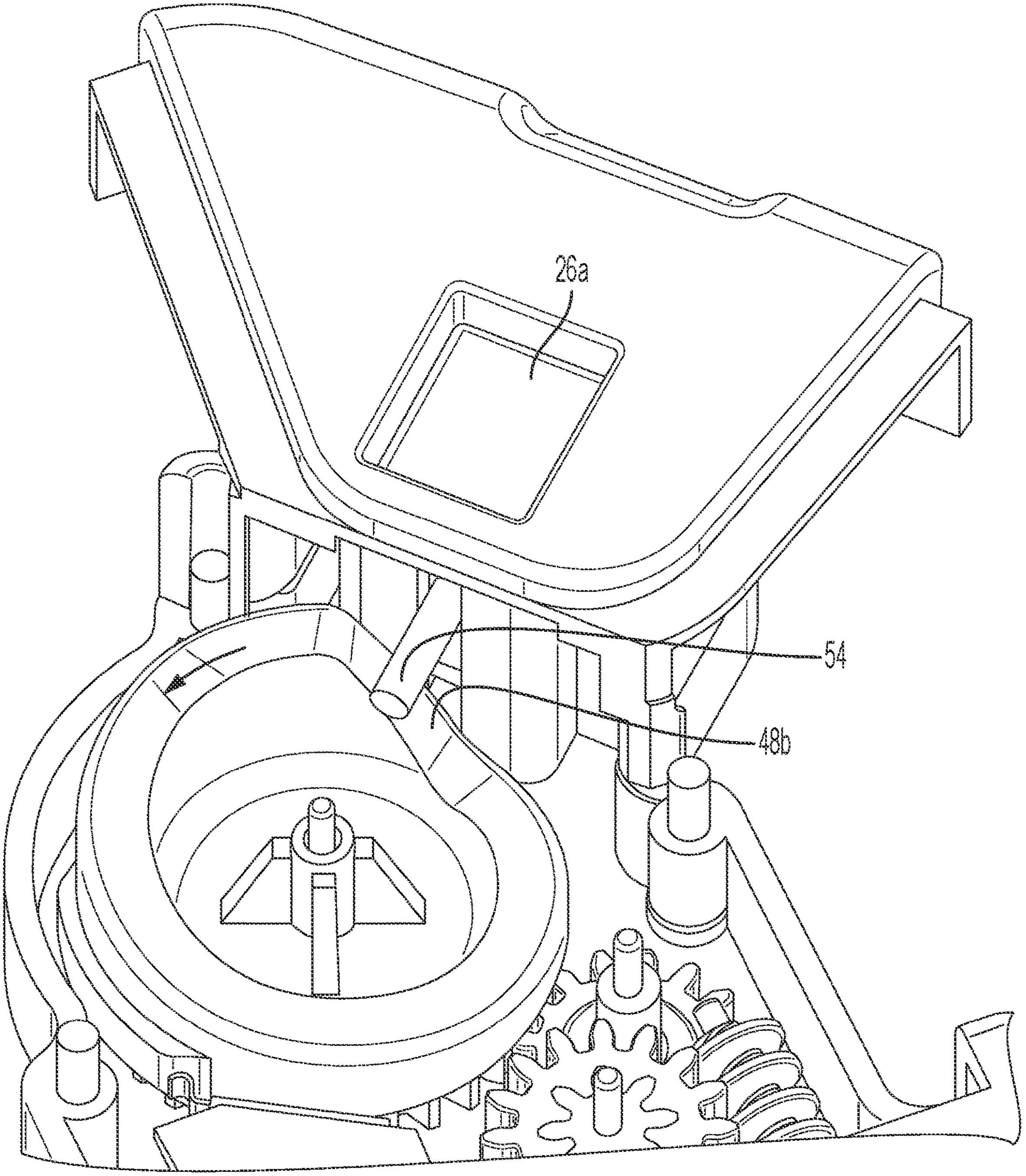

Referring now to an exemplary method of operating the striker 20, FIGS. 11A-11E depict sequential movement of the plunger 26 from the withdrawn position (FIG. 11A), to the deployed position (FIG. 11D) and back towards the withdrawn position (FIG. 11E). The door 12 initially starts in a closed and locked state (not shown), in which the pawls 24 are positioned in their respective passageways 22 and the plunger 26 is in a withdrawn state (as shown in FIGS. 1, 2A, 3C, and 11A). In the closed state of the door 12, it may not be possible to open the door 12.

To open the door 12, a user contacts, activates or depresses a remotely-located button, switch or icon 80, by way of example. The remotely-located button, switch or icon 80, which is shown schematically in FIG. 1, is connected to the circuit board 70 by either a wireless or wired connection. The button, switch or icon 80 may be located on a remote control, the dashboard or a touchscreen of a vehicle, by way of non-limiting example. Activating the remotely-located button, switch or icon 80 causes the controller of the striker 20 to activate the motor 32. The motor 32 then rotates the output shaft 34, which causes rotation of the gears 36, 38, 42 and 44. Specifically, the motor 32 rotates the gear 44 by a single revolution, as sensed and permitted by the switch 56.

Referring now to FIGS. 3A and 11A, prior to rotation of the gear 44 in the direction of the arrow depicted in FIGS. 3A, the gear 44 is initially positioned such that the pin 54 is positioned at the low elevation point 48*d* on the cam surface 48, which corresponds to a withdrawn position of the plunger 26. Also, the wiper 57 of the switch 56 is positioned either at or near the curved entrance surface 50*a* of the protrusion 50 of the gear 44. As the gear 44 rotates, the pin 54 rides up the gently sloping surface 48*a* of the cam surface 48 of the gear 44 against the bias of the spring 62. Consequently, the plunger 26 translates outwardly towards the deployed state, consequently moving the pawl 24*a* out of the passageway 22. In other words, the plunger 26 pushes the pawl 24*a* out of the passageway 22, in contrast to other known solutions in which a member pulls a pawl out of a passageway. The other pawl 24*b* also moves out of its passageway 22 due to the gearing arrangement 25 between the pawls 24*a* and 24*b*. As shown in FIG. 11D, the pin 54 eventually reaches the highest elevation point 48*c* on the cam surface 48 at which time the plunger 26 is positioned in a fully-deployed position. The plunger 26 then pushes the pawl 24*a* either nearly or completely out of the passageway 22. At this time, the door 12 falls to the open position under its own weight.

Without stopping, the motor 32 continues to rotate the gear 44 in the same direction, and, as shown in FIG. 11E, the pin 54 then slides down the rapidly sloping surface portion 48*b* of the cam surface 48 under the bias of the spring 62 and ultimately reaches the lowest elevation point 48*c* on the cam surface 48. At this point, the plunger 26 is located at the withdrawn position shown in FIG. 1. In the withdrawn position of the plunger 26, the passageway 22 is ready to again receive the pawl 24*a* of the door 12. The gear 44 continues to rotate until the wiper 57 of the switch 56 is positioned either at the curved entrance surface 50*a* of the protrusion 50 of the gear 44. When the wiper 57 encounters the entrance surface 50*a*, the switch 56 transmits a signal to the controller of the striker 20 indicating that the gear 44 has rotated by a single revolution. Consequently, the controller stops the motor 32. At this point, the plunger 26 is still maintained in the withdrawn position such that the passageway 22 is ready to again receive the pawl 24*a* of the door 12. From start to finish, the gear 44 rotates by a single revolution.

In the event of a power failure, the plunger 26 may remain in the withdrawn position so that the glove box can remain locked. To unlock the glove box during a power failure or other situation requiring a manual override of the striker 20, a user can push on the end 26*b* of the plunger 26 (see FIG. 2B) against the bias of the spring 62 to release the pawl 24*a* from its passageway 22. The vehicle may include a removable service access panel on the dashboard, for example, to enable a user to access the end 26*b* of the plunger 26. It is noted that in the withdrawn state of the plunger 26, the end 26*b* of the plunger 26 extends through an opening in the lid 31 of the housing 29 (see FIG. 2B) and is exposed, so that the plunger 26 is accessible to the user.

It should be understood that the above description of operating the striker 20 is not limited to any step or sequence of steps, and may vary from that which is shown and described without departing from the scope and spirit of the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An electronic striker for releasing a door or access panel, the electronic striker comprising:

a housing defining an opening;

a plunger that is coupled to the housing and is mounted for movement with respect to the opening;

a motor configured for moving the plunger between a withdrawn position, and a deployed position, in which the plunger is extended relative to the withdrawn position;

a gear arrangement that is configured to convert rotation of an output shaft of the motor to linear translation of the plunger between the withdrawn and deployed positions, wherein the gear arrangement comprises a cam lifter gear having a cam surface, and the plunger comprises a cam follower that engages with the cam surface, wherein rotation of the cam surface causes translational movement of the cam follower, wherein the cam follower is a pin that is fixed to the plunger;

wherein the cam surface is a continuous surface that rises and falls in a direction that is parallel to an axis of rotation of the cam lifter gear, wherein the cam surface comprises a first sloping surface that slopes up in an upward direction toward of a top end of the cam lifter gear which is followed by and joined to a second sloping surface that slopes in a downward direction toward a bottom end which is opposite the top end of the cam lifter gear, as viewed in a circumferential direction and along the axis of rotation; and wherein the plunger is configured to move the pawl when the plunger is moved from the withdrawn position to the deployed position, thereby releasing the door or access panel.

2. The electronic striker of claim 1, wherein the plunger is positioned further from the opening in the withdrawn position than in the deployed position.

3. The electronic striker of claim 1, wherein the opening is defined on an exterior facing surface of the housing.

4. The electronic striker of claim 1 further comprising a spring for biasing the cam follower against the cam surface.

5. The electronic striker of claim 1 further comprising an indexing means defined on one of the gears of the gear arrangement.

6. The electronic striker of claim 5 further comprising a sensor for interacting with the indexing means to sense a rotational position of said one of the gears of the gear arrangement.

7. The electronic striker of claim 6 further comprising a controller that is connected to both the sensor and the motor, and is configured to deactivate the motor as a function of the rotational position of said one of the gears of the gear arrangement, as sensed by the sensor.

8. The electronic striker of claim 7 further comprising a button, switch or icon, which is remotely located from the electronic striker, that communicates with the controller for activating the motor upon receiving instructions from a user.

9. The electronic striker of claim 1, wherein the plunger includes a first end that is configured to contact the pawl, and a second end that is opposite the first end, and wherein the housing includes another opening through which the second end extends when the plunger is positioned in the withdrawn position.

10. A glove box system comprising the electronic striker of claim 1 that is mounted to a vehicle glove box housing.

11. The glove box system of claim 10 further comprising the door, the pawl, a second pawl, and a gearing arrangement for connecting the pawls so that the pawls are configured to be moved simultaneously.

12. The electronic striker of claim 1, wherein:

the housing defines a passageway extending from the opening for receiving a pawl on the door or access panel;

the plunger is mounted for movement within the passageway; and when the plunger is in the withdrawn position, in which the plunger is withdrawn within the passageway, and when the plunger is in the deployed position, the plunger is extended within the passageway relative to the withdrawn position, wherein the plunger is configured to move the pawl out of the passageway upon moving the plunger from the withdrawn position to the deployed position, thereby releasing the door or access panel from the passageway.

13. A method of using the electronic striker of claim 12 in a manual override mode to release a door or access panel from a housing for the door or access panel, the method comprising:

manually moving the plunger of the electronic striker from the withdrawn position, in which the plunger is withdrawn within the passageway, to the deployed position, in which the plunger is extended within the passageway; and simultaneously moving the pawl of the door or access panel during the manual movement step from a position in which the pawl is positioned within the passageway to a position in which the pawl is positioned either outside or substantially outside of the passageway, thereby releasing the door or access panel from the housing for the door or access panel.

14. The method of claim 13, wherein the manual movement step comprises pushing a first end of the plunger that is opposite to a second end of the plunger that contacts the pawl, wherein, in the withdrawn position of the plunger, the first end of the plunger extends from a housing of the electronic striker to a location outside of the electronic striker.

15. The electronic striker of claim 1, wherein an absolute value of a slope of the second sloping surface is greater than another absolute value of a slope of the first sloping surface.

16. The electronic striker of claim 1, wherein the pin is positioned at a low elevation point defined on the cam surface, which corresponds to the withdrawn position of the plunger and as the cam lifter gear rotates, the pin rides up the first sloping surface of the cam surface until it reaches a highest elevation point on the cam surface, which corresponds to the deployed position of the plunger.

17. The electronic striker of claim 16, wherein as the motor continues to rotate the cam lifter gear, the pin slides down the second sloping surface portion of the cam surface until the pin reaches the lowest elevation point on the cam surface, which corresponds to the withdrawn position of the plunger.

18. The electronic striker of claim 17, further comprising a spring for biasing the pin against the cam surface, wherein the pin rides up the first sloping surface of the cam surface against the bias of the spring until the pin reaches the highest elevation point on the cam surface, and wherein the pin slides down the second sloping surface portion of the cam surface under the bias of the spring until the pin reaches the lowest elevation point on the cam surface.

19. A method of using an electronic striker to release a door or access panel from a housing for the door or access panel, the housing defining an opening, the method comprising:

activating a motor of the electronic striker to move a plunger of the electronic striker from a withdrawn position, in which the plunger is withdrawn within a passageway, to a deployed position, in which the plunger is extended within the passageway, the plunger being coupled to the housing and is mounted for movement with respect to the opening;

simultaneously moving a pawl of the door or access panel during the activating step from a position in which the pawl is positioned within the passageway to a position in which the pawl is positioned either outside or substantially outside of the passageway, thereby releasing the door or access panel from the housing for the door or access panel;

wherein, upon activating the motor, an output shaft of the motor rotates a gear, and rotation of the gear causes linear translation of the plunger between the withdrawn and deployed positions;

wherein the gear is a cam lifter gear having a cam surface, and the plunger comprises a cam follower that engages with the cam surface, wherein rotation of the cam surface of the gear causes translational movement of the cam follower, wherein the cam follower is a pin that is fixed to the plunger; and wherein the cam surface is a continuous surface that rises and falls in a direction that is parallel to an axis of rotation of the cam lifter gear, the cam surface comprising a first sloping surface that slopes up in an upward direction toward of a top end of the cam lifter gear which is followed by and joined to a second sloping surface that slopes in a downward direction toward a bottom end which is opposite the top end of the cam lifter gear, as viewed in a circumferential direction and along the axis of rotation.

20. The method of claim 19, further comprising biasing the cam follower against the cam surface.

21. The method of claim 19, wherein the gear comprises an indexing means, and the method further comprises sensing said indexing means upon rotation of the gear.

22. The method of claim 21 further comprising deactivating the motor in response to sensing the indexing means.

23. The method of claim 19 further comprising activating the motor based upon a signal received from a button, switch or icon, which is located remotely from the electronic striker.

* * * * *